(12) United States Patent
Kainuma (10) Patent No.: US 7,456,839 B2
(45) Date of Patent: Nov. 25, 2008

(54) SCREEN CREATING DEVICE (75) Inventor: Hironori Kainuma, Habikino (JP)

(73) Assignee: Digital Electronics Corporation, Osaka (JP)

( * ) Notice: Subject to any disclaimer, the term of this patent is extended or adjusted under 35 U.S.C. 154(b) by 58 days.

(21) Appl. No.: 11/234,966

(22) Filed: Sep. 26, 2005

(65) Prior Publication Data
US 2006/0066626 A1 Mar. 30, 2006

(30) Foreign Application Priority Data
Sep. 30, 2004 (JP) ............................ 2004-286637

(51) Int. Cl.
*G06T 15/00* (2006.01)
(52) U.S. Cl. ..................... 345/564; 345/530; 709/220
(58) Field of Classification Search ................. 345/564, 345/530, 531, 543, 553, 565; 709/220, 224, 709/250, 217, 230; 701/1; 707/100
See application file for complete search history.

(56) References Cited

U.S. PATENT DOCUMENTS

| | | | | |
|---|---|---|---|---|
| 5,938,736 | A | * | 8/1999 | Muller et al. ................ 709/243 |
| 7,089,335 | B2 | * | 8/2006 | Aiken et al. ................. 709/250 |
| 2005/0114535 | A1 | * | 5/2005 | Il et al. ........................ 709/230 |
| 2006/0179120 | A1 | * | 8/2006 | Kegoya et al. .............. 709/217 |

FOREIGN PATENT DOCUMENTS

| | | | |
|---|---|---|---|
| JP | 2000-047775 | | 2/2000 |
| JP | 2000-47775 | * | 2/2000 |

* cited by examiner

*Primary Examiner*—Phu K Nguyen
(74) *Attorney, Agent, or Firm*—Renner, Otto, Boisselle & Sklar, LLP (57) ABSTRACT

A screen creating device includes a screen creating section and an address assigning section. The screen creating section forms a screen including a display element for showing a condition under which data is read out of or written in a region of a memory specified by an address. The address assigning section assigns a particular address to the display element so as to cause the display element to display a condition of read/write of data of the particular address. Further, the screen creating section displays an address list for showing a usage condition of the address, as well as a screen creating region for creating the screen.

27 Claims, 7 Drawing Sheets

SCREEN CREATING DEVICE

This non-provisional application claims priority under 35 U.S.C. § 119(a) on Patent Application No. 2004/286637 filed in Japan on Sep. 30, 2004, the entire contents of which are hereby incorporated by reference.

FIELD OF THE INVENTION

The present invention relates to a screen creating device for creating a screen to be displayed on a display device such as a programmable display device, and which screen creating device allows easy assigning of an address to an object such as a part displayed on the screen.

BACKGROUND OF THE INVENTION

A programmable display device is an operational display device having an interface with a host controller (PLC), and having functions such as for displaying an operating condition of a device connected to the host controller and receiving from a screen an operational input for giving control instructions to the device. Generally, a programmable display device has a graphical display function, and accordingly can display an console, a switch, a display lamp and the like, so as to serve as an operating terminal in a controlling system.

A screen displayed on such a programmable display device can be created by a user, using screen creation software, according to a specification of a controlling system. In creating a screen, the user uses parts, a drawing function and the like provided by the screen creation software in a personal computer and the like, so as to create a desired screen.

The parts are images for illustrating a switch, a numeric keypad, a meter display device, a graph display device and the like, and are provided in a library form in the screen creation software so as to be combined and used in the same manner as real parts. Further, the parts are used in a manner where images for showing the parts, and assigning data for displaying dynamic changes of the images on a specified position of the screen, are combined with one another. The assigning data is stored as a portion of screen data in a memory of the programmable display device.

The created screen is transferred as the screen data to the programmable display device and stored therein. When the host controller is in operation, an output part such as the meter display device, displayed on the screen displayed on a display section of the programmable display device, changes dynamically according to a condition of a device connected to the host controller. Further, input operations performed on the screen at an input part displayed on the screen, such as a switch, is provided to the device as control instructions.

Generally, in screen creation software, in order to reflect a condition of a device on a displayed screen, or to reflect an input instruction via a part on a condition of the device, an address of a memory in a PLC for storing data of the device is assigned to the part. To perform such assigning of an address, it is necessary to determine which address is unused and available. A document disclosing a technique for determining unused addresses is Japanese Laid-Open Patent Publication 2000/47775 (Tokukai 2000-47775) (published date; Feb. 18, 2000). This document discloses a technique for displaying, by use of a figure, a memory range of a PLC and for displaying, within the memory range, by use of a figure, an address range that is referred to by the programmable display device. As a result, it is easy to determine which addresses out of the entire range of addresses are unused.

Conventional screen creation software can determine a condition of address usage as described above, but when an unused address is determined and the address is then assigned to a part, there are the following problems.

First, display of a figure (an address displaying figure) for displaying a usage condition of addresses is performed as a process different from that of assigning of an address. Therefore, it is necessary to confirm an unused address, temporarily close a screen of an address displaying figure, and then open a screen for assigning of an address. As a result, it is not possible to view the address displaying figure while performing assigning of an address, such that it is not possible to make real-time confirmation of a currently assigned address in the address displaying figure.

Next, when the address displaying figure is displayed, a process is carried out in which parts on the all screens are scanned one by one so as to confirm which address is used for which part. As a result, the more numerous the number of screens becomes, the longer it takes to display the address displaying figure.

SUMMARY OF THE INVENTION

The object of the present invention is to provide a screen creating device which allows assigning of an address while confirming a usage condition of an address.

In order to achieve the object, the screen creating device of the present invention includes: a screen creating section for creating a screen showing a display element which displays a condition under which data is read out of or written in a region of a memory specified by an address, and which screen creating section displays an address list for showing a usage condition of the address, as well as a screen creating region for creating the screen; and an address assigning section for assigning a particular address to the display element, so as to cause the display element to display a condition of read/write of data of the particular address.

With the structure, the screen creating section displays an address list as well as the screen creating region, so that a user can assign an address to a display element while monitoring a usage condition of addresses displayed in the address list.

For a fuller understanding of the nature and advantages of the invention, reference should be made to the ensuing detailed description taken in conjunction with the accompanying drawings.

DESCRIPTION OF THE EMBODIMENTS

An embodiment of the present invention is described below with reference to FIGS. 1 through 10.

Figure 1:
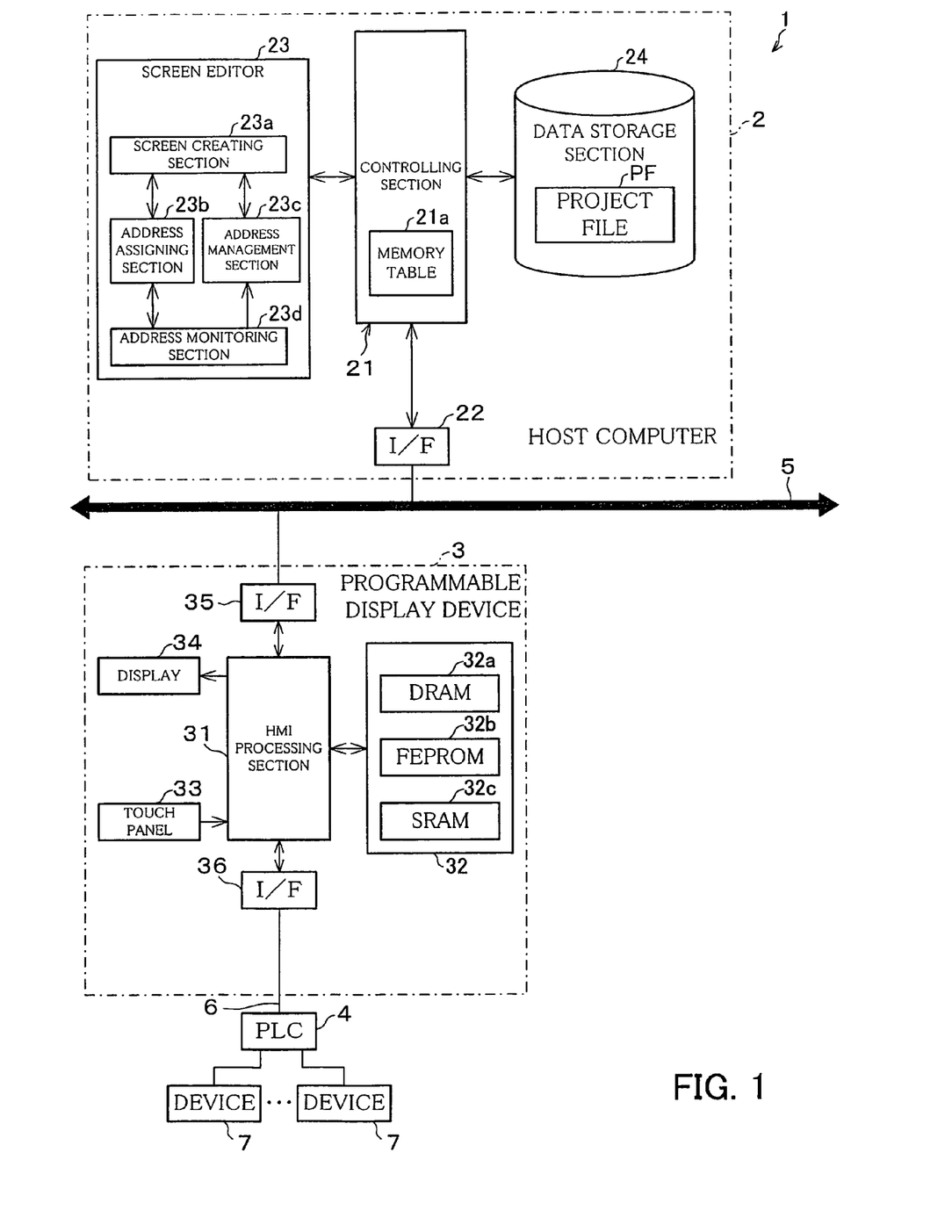
FIG. 1 is a block diagram illustrating a structure of a controlling system according to an embodiment of the present invention.

As illustrated in FIG. 1, a controlling system 1 according to the present embodiment includes a host computer 2, a programmable display device 3, a PLC 4, a common network 5, an exclusive network 6, and a device 7.

The host computer 2 and the programmable display device 3 are connected with each other via the common network 5. On the other hand, the programmable display device 3 and the PLC 4 are connected with each other via the exclusive network 6. The common network 5 is a network such as a local area network (LAN) constituted of Ethernet™ and the like, by which it is possible to communicate through use of a common communication protocol. The exclusive network 6 is a network constituted of a serial cable and the like, by which it is possible to communicate through use of a communication protocol exclusive to the PLC 4 (an exclusive communication protocol). Because the PLC 4 has developed from a sequencer, much of the exclusive communication protocols differ from one another between machine-types of the PLC 4, e.g. differ according to manufacturing companies or to productions, even if the productions are made by the same company.

The controlling system 1 according to the present embodiment connects the programmable display device 3 and the host computer 2 via the common network 5, the programmable display device 3 being connected with the PLC 4, and adopts a common protocol as the common communication protocol used in the common network 5, the common protocol being determined independently of the exclusive communication protocol. Further, as mentioned later, the programmable display device 3 has a function for converting a protocol, and, for example, performs a protocol conversion such as a conversion of a command code, a conversion of an argument code, or a conversion of a controlling code in transmission, so as to relay communication between the host computer 2 and the PLC 4 connected to the programmable display device 3.

In such a structure, the programmable display device 3 functions as an HMI (human machine interface) and accordingly has a reserve capacity in its computing power compared with the PLC 4. Therefore, the programmable display device 3 processes much of the communication. It is possible to directly communicate from the host computer 2 to the programmable display device 3 without mediation by the PLC 4, and an example of which is a download of screen data. Therefore, a burden of the PLC 4 can be reduced, so that a computing ability necessary for the whole of the controlling system 1 can be reduced. Note that while waiting for an input from an operator, the programmable display device 3 has a reserve capacity, such that it can perform protocol conversion without requiring an increase in the computing ability for protocol conversion.

Further, the programmable display device 3 may be arranged so as to be connected with the host computer 2 via a screen transfer cable (not shown). The screen transfer cable is used for transferring, to the programmable display device 3, screen data formed in the host computer 2 as mentioned later, and can be a USB (Universal Serial Bus) cable and the like. The screen creation software (a screen editor 23) is installed in the host computer 2, and the host computer 2 is connected with the programmable display device 3 via the screen transfer cable, when the screen data formed as mentioned later is transferred. On the other hand, during a time of operation of the controlling system 1 when the programmable display device 3 and the PLC 4 communicate with each other, the programmable display device 3 is disconnected with the host computer 2 via the screen transfer cable.

The PLC 4 receives output data from a device 7 for input via an input unit, and on the other hand provides controlling data to a device 7 for output, according to a controlling program (a ladder program) made by a user. As the device 7 for input, devices such as sensors (e.g. a temperature sensor and a light sensor) and switches (e.g. a push button switch, a limit switch and a pressure switch) are used. As the device 7 for output, devices such as an actuator, a relay, an electromagnetic valve and a display device are used. Such devices 7 are disposed in appropriate parts of target systems such as a manufacturing line. Further, the device 7 may be arranged so as to be a particular region in a later-mentioned memory section 32 for storing data inputted by manual operation from an input device such as a later-mentioned touch panel 33.

A memory in the PLC 4 (a device memory) stores data concerning a condition of the device 7 or data for changing the condition of the device 7 (e.g. word data or bit data) in a region specified by a device address. In the memory, a word device is set as a region for storing word data whose data for input/output is a numeral value, and is specified by a word address (a device address). Further, a bit device is set as a region for storing bit data such as an on/off condition, and is specified by a bit address (a device address). With such setting, it is possible to control the devices 7 or to take out respective information items about conditions of the devices 7, simply by accessing an arbitrary word device or bit device in the PLC 4.

The device address is suitably referred to as an address hereinafter.

The programmable display device 3 is a computer having a processor such as a CPU, and carrying out a program (screen data) made by a user for allowing input operation and display, so as to realize an operational function and display function exclusive to a programmable display device. The programmable display device 3, which is preferably used as an HMI of the controlling system 1, determines a performance of displaying on a screen a condition of the device 7 or a performance of controlling the condition of the device 7 according to an operation performed on the screen, based on screen data determined by combining later-mentioned process-indicating words (tags). The programmable display device 3 has a function of communicating with the PLC 4 via the exclusive network 6 so as to acquire conditions of each device 7 whose condition is to be displayed on a display screen via the PLC 4 connected to the programmable display device 3, and displaying the conditions of each device 7 on, for example, a later-mentioned display 34. Further, the programmable display device 3 has a function of instructing condition control to the device 7 according to an operation performed on a later-mentioned touch panel 33.

Note that the programmable display device 3 may be such that it instructs acquisition of/change in the condition of the device 7 on a case-by-case basis, or that the programmable display device 3 includes a cache and accesses it when the condition of the device 7 is to be acquired/changed, and at the same time communicates with the PLC 4 with respect to each predetermined interval or each predetermined event, so as to synchronize an entity of the device address.

In order to achieve the above function, the programmable display device 3 includes an HMI processing section 31, a memory section 32, a touch panel 33, a display 34 and interface sections (I/F in FIG. 1) 35 and 36. Main sections of the programmable display device 3 are fully explained below.

The touch panel 33 is an input device provided for allowing inputs via a display screen of the display 34. As the display 34, a flat type display such as a liquid crystal display or an EL display is preferably used, so that the programmable display device 3 is made thin.

The interface section 35 is a communication controlling section by which the programmable display device 3 communicates with the host computer 2 and the like on the common network 5, and is connected with the common network 5. By communication via this common network 5, data transmission is performed between the programmable display device 3 and the host computer 2. On the other hand, the interface section 36 is a communication controlling section by which the programmable display device 3 communicates with the PLC 4, and is connected to the exclusive network 6. With communication via this exclusive network 6, data transmission is performed between the programmable display device 3 and the PLC 4.

In a communication system with the above structure, output data from the PLC 4 is transmitted to the programmable display device 3, and via the programmable display device 3, sent on to the host computer 2 or other devices (not shown in the figures) connected with the common network 5. Further, not only data set in the programmable display device 3 is directly transmitted to the PLC 4, but also assigning data transmitted from the host computer 2 or other devices is sent on to the PLC 4 via the programmable display device 3 connected with the PLC 4.

The HMI processing section 31 performs a variety of data processing, in order to perform later-mentioned display control of a user screen and a protocol conversion process.

Figure 2:
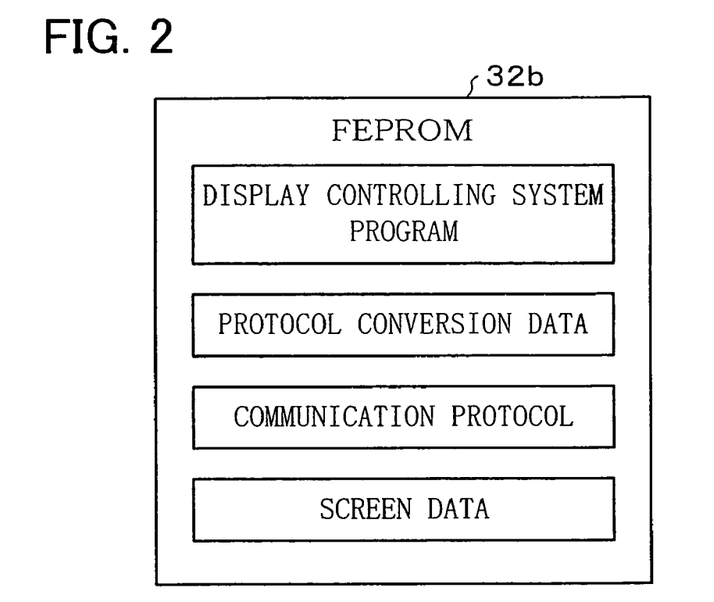
FIG. 2 is an explanatory diagram illustrating a structure of a program stored in an FEPROM of a programmable display device in the controlling system.

When the networks 5 and 6 have communication protocols different from each other, the protocol conversion process converts one communication protocol to the other communication protocol, referring to later-mentioned protocol conversion data stored in a FEPROM 32b. The protocol conversion process is realized by a protocol conversion program stored in the memory section 32 being carried out by operation processing means such as a CPU. A display controlling process (display controlling function) is fully mentioned later.

The memory section 32 includes a memory such as a DRAM 32a, a FEPROM (Flash Erasable and Programmable ROM) 32b, and an SRAM 32c.

The DRAM 32a is used for temporarily storing data transmitted and received between the memory section 32 and the PLC 4, as well as mainly for operation processing such as display control. Particularly, the DRAM 32a includes a state-memory region for transmitting to and receiving from the memory of the PLC 4 a condition of the device 7 (contents of the device address) stored in the memory of the PLC 4.

The SRAM 32c is used for logging data obtained from the PLC 4 and for storing data (recipe data) to be given to the PLC 4.

The FEPROM 32b is a flash memory that is read-only yet rewritable, and serves as a hard disc drive in a general personal computer. The flash memory does not have a movable section and is resilient to shock, allowing it to function stably even in a non-ideal environment.

Further, as illustrated in FIG. 2, the FEPROM 32b includes areas for respectively storing a display controlling system program, protocol conversion data, a communication protocol, and screen data.

The display controlling system program realizes a basic function for performing an image display control. The function that the display controlling system program realizes in the HMI processing section 31 is fully explained later.

The protocol conversion data may have any form as long as the data can perform reciprocal conversion of the communication protocols of the exclusive network 6 and the common network 5. In the present embodiment, the protocol conversion data stores: a data-transfer format indicative of the format of data transmitted by the exclusive network 6; and a command conversion table indicative of a correspondent relation between command codes transmitted respectively by the networks 5 and 6.

The communication protocol (exclusive communication protocol) is used for a communication process with the PLC 4, and is set exclusive to each machine-type (maker) of the PLC 4. The communication protocol includes a command code which instructs reading out of data to the PLC 4. This command code is combined with the address corresponding to a controlling function of the PLC 4, so as to transmit data regarding a desired controlling function to the PLC 4.

The screen data is data of a screen displayed on the programmable display device 3, and includes data of a base screen and parts to be displayed on the display 34, and later-mentioned process-indicating words W which are given to each part. The screen data is created by a later-mentioned screen editor 23 and is downloaded to the FEPROM 32b. The screen data is stored as a screen file in the FEPROM 32b in the form of a file. The screen file is constituted of a figure data section and an address data section. The figure data section includes figure data (e.g. a circle and a quadrangle), data of parts, character strings, process-indicating words W and the like. The address data section includes addresses and comments corresponding to the addresses, both of which are set by the screen editor 23. The addresses correspond to data in the figure data section, such as the data of parts or the process-indicating words W.

Examples of the comments are as follows: the name of an event such as an operating condition of a device; a sign corresponding to the device 7, such as SW corresponding to a switch or LAMP corresponding to a lamp; and an operational instruction. Further, the comment can be used as a variable. The thus defined comment corresponds in advance to the above-mentioned device address corresponding to the device 7.

Figure 3:
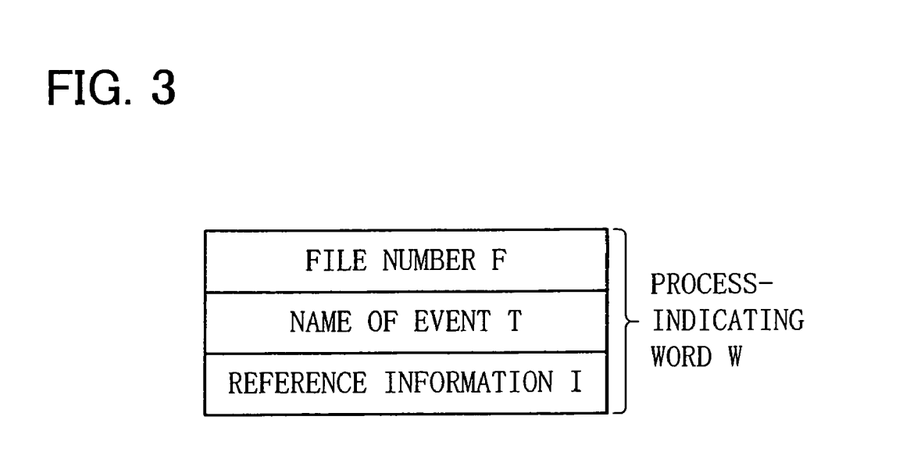
FIG. 3 is an explanatory diagram illustrating a basic format of a process-indicating word included in screen data of a user screen displayed in the programmable display device.

As illustrated in FIG. 3, the process-indicating word (tag) W is formed with respect to each event to be executed on the base screen. This process-indicating word W basically includes a file number F of a base screen for carrying out a display controlling operation, a name-of-event T for specifying an operation content to be carried out on this base screen, and reference information I constituted of one piece of or more data that is referred to with respect to each event to be executed, the file number F, the name-of-event T and the reference information I being a set.

In the programmable display device 3 according to the present embodiment, as the tag, two tags are prescribed: one is a display tag for indicating a correspondence between a region on the base screen (a display range) and the device address of the device 7 corresponding to display on the region, and the other is an input tag for indicating a correspondence between a region on the screen (an input range) and an address corresponding to a touch input performed on the region. Further, in the present embodiment, each tag can be connected with at least one of a plurality of unit screens.

Coupled with the operation on the touch panel 33, the display tag makes it possible to display a predetermined figure at a corresponding position on the base screen. Namely, the display tag includes a file number of a base screen as the file number F, includes the name of an event which specifies display of a display object (e.g. a figure) as the name-of-event T, and includes a display coordinate range of the display object, a file number for specifying the display object to be brought up, and the address for referring to the display object in display as the reference information I.

Further, coupled with a touch operation on the touch panel 33, the input tag makes it possible, for example, to invert a bit device set in a predetermined address position in the above-mentioned state-memory region provided in the DRAM 32a. Namely, the input tag includes a file number of a unit screen as the file number F, includes the name of an event which specifies an operation of the touch panel 33 as the name-of-event T, and includes, as the reference information I, an input coordinate range which enables an input operation from the touch panel 33, and an address whose data is to be rewritten, coupled with the touch operation on the touch panel 33.

Figure 4:
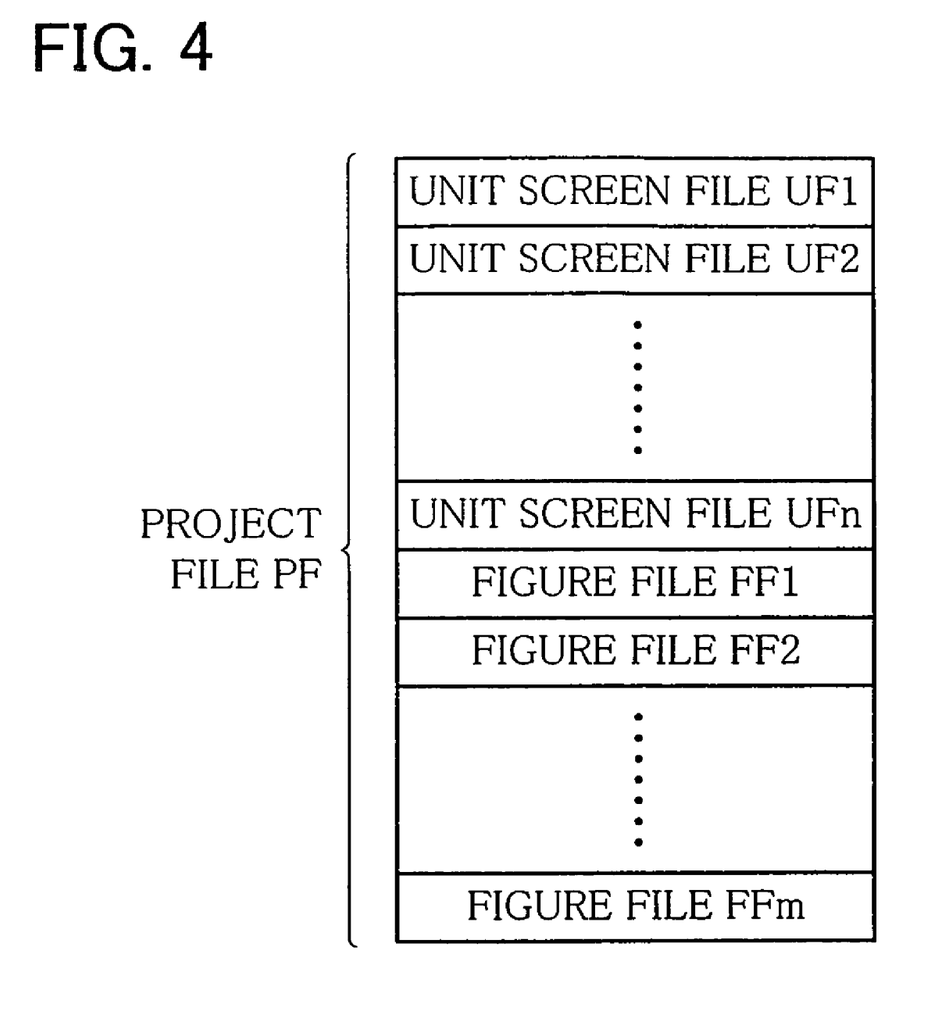
FIG. 4 is a figure illustrating a structure of a screen file stored in the FEPROM.

As illustrated in FIG. 4, a screen file is constituted of a project file PF which is made of: one or more unit screen file, such as UF1, UF2, . . . , UFn (when unit screens are referred as a whole, they are referred to merely as 'UF' hereinafter); and related figure files FF1, FF2, . . . , FFm to be brought up from each unit screen UF and displayed. In the project file PF, each unit screen file UF is hierarchically connected with one another. For example, from the unit screen file UF1 which becomes a main screen, the unit screen file UF2 is brought up, and from this unit screen file UF2, the unit screen file UF3 is brought up. Further, the unit screen file UF is constituted as one unit screen file UF, in which data items indicative of each display factor constituted on the base screen are put into one.

The display controlling function of the HMI processing section 31 is a function for realizing: display of the screen data; setting of a variety of data items to the user screen; transmission of thus set data items to the PLC 4; and display of data items received from the PLC 4 on the user screen, by causing the operation processing means (e.g. CPU) included in the programmable display device 3 to carry out the above-mentioned display controlling system program. This display controlling function extracts from the screen data a display tag related to a unit screen currently displayed, reads out contents of device addresses related to each display tag with respect to each cycle predetermined by each display tag, and displays parts and the like in a display-style specified by the display tag, on a specified region on the screen, in a style according to a read out value. On the other hand, the display controlling function accepts input operation on the touch panel 33, searches, from the screen data, an input tag which corresponds to the unit screen currently displayed and which matches the input operation, and rewrites the content of a device address (data stored in a memory region specified by the device address) indicated by the input tag, according to the result of input. As a result, the programmable display device 3 can display the condition of the device 7 indicated by the screen data, in a display style indicated by the screen data, at a display position (e.g. a part) indicated by the screen data, and control the condition of the device 7 according to the input operation by a part and the like in the display data.

Next, the host computer 2 is explained. As with a general multi-purpose personal computer, the host computer 2 includes a CPU, a memory (such as RAM or ROM), an external storage device (such as a hard disc drive or an MO drive), a display device and an input device (such as a key board or a mouse). Further, as illustrated in FIG. 1, the host computer 2 includes a controlling section 21, an interface section (shown as I/F in FIG. 1) 22, a screen editor 23 and a data storage section 24.

The interface section 22 is a communication controlling section for communicating with the programmable display device 3, and is connected with the common network 5.

The controlling section 21 includes a CPU and a memory, performs an operation process, and carries out, on an operating system, the screen editor 23 provided as an application program. The host computer 2 serves as a screen creating device by causing the controlling section 21 to carry out the screen editor 23. The screen editor 23 is stored in a storage medium detachable from the host computer 2, and is able to be installed from the storage medium to the host computer 2.

The storage medium (program media) is readable by a computer. The preferable examples of the storage medium are as follows: tapes such as an electromagnetic tape and a cassette tape, magnetic discs such as a flexible disc and a hard disc, optical discs such as CD-ROM, MO, MD and DVD, and cards such as an IC card (including a memory card) and an optical card. In addition, the storage medium may be a medium fixedly supporting a program, and including a semiconductor memory. The examples of such storage mediums are as follows: masked ROM, EPROM, EEPROM and flash ROM.

Further, because the present controlling system 1 has a system structure possible to be connected with a communication network including the Internet, the storage medium may be a medium fluidly supporting a program, whereby the program may be downloaded from the communication network. However, in a case of downloading a program from the communication network in this way, a program for downloading may be stored in advance in the host computer 2, or may be installed from other storage medium.

The screen editor 23 provided as a screen creating program includes a screen creating section 23a, an address assigning section 23b, an address management section 23c and an address monitoring section 23d.

In order to create the user screen exclusive to the user, the screen creating section 23a includes parts such as a switch, a lamp, a numeric keypad, a variety of display devices (e.g. a numerical value display device, a meter display device and a graph display device), a variety of tag setting functions, drawing functions and text input functions. The provided parts are not only single-function parts, but also plural-function parts such as a complex switch, a counter and a timer, having a plurality of functions. Parts as display factors are registered in a library-form so that the user can easily select them, and input tags and display tags according to functions of the parts are given in advance. The drawing function is a function for drawing a line figure (a display factor) such as a line or a curve, and for daubing with specified colors and patterns the drawing and figure of a base figure (a display factor) such as a circle, a quadrangle, and a triangle. Further, the screen creating section 23a puts together data items indicative of each display factor constituted on the base screen and constitutes one unit screen file UF, and at the same time puts together a plurality of unit screen files UF and constitutes the project file PF.

Figure 5:
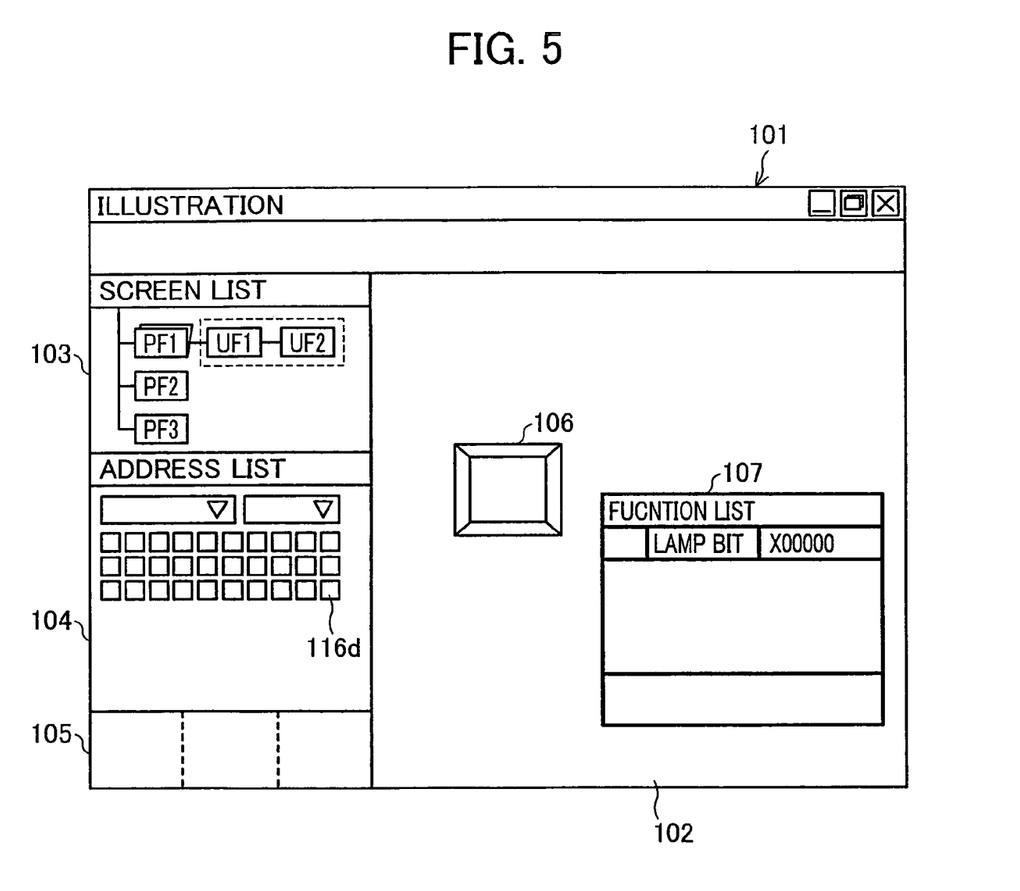
FIG. 5 is a figure illustrating a structure of an screen creating window provided by a screen editor of the controlling system.

In order to create a screen, the screen creating section 23a provides a screen creating window 101 shown in FIG. 5 as a user interface. The screen creating window 101 includes an editing region 102, a screen list region 103, an address list region 104 and a reference display region 105. The screen list region 103, the address list region 104 and the reference display region 105 are provided in a docking style at the left side of the editing region 102.

The editing region 102 is a region for creating a screen on which a part 106 such as a switch or a lamp is disposed, and drawing is performed.

The screen list region 103 is a region for displaying a list of a structure of the project file PF. The address list region 104 is a region for displaying a current usage condition of addresses. The reference display region 105 is a region for displaying a list of functions of parts to which addresses in use are assigned.

Figure 6:
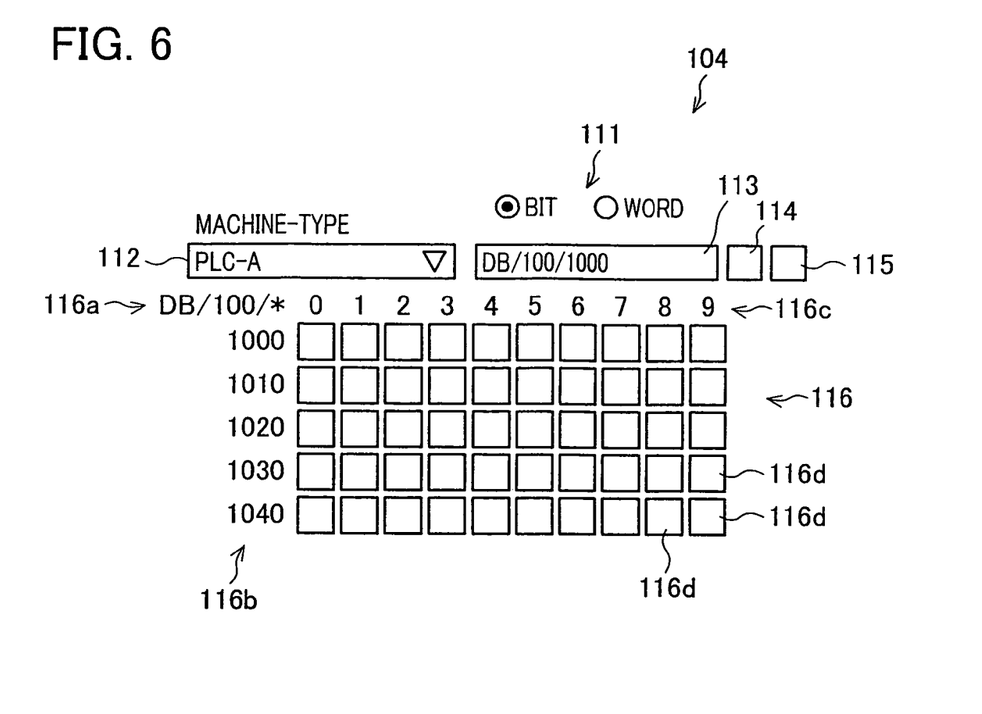
FIG. 6 is a figure illustrating a detailed structure of an address list region provided in the screen creating window.

As shown in FIG. 6, the address list region 104 includes an address mode selecting section 111, a machine-type selecting field 112, an address input field 113, an address input dialog display button 114, a jump button 115 and an address display section 116.

The address mode selecting section 111 includes radio buttons for selecting a bit mode (a bit address) or a word mode (a word address). When the bit mode is selected, a usage condition of the bit address is displayed on the address display section 116, and when the word mode is selected, a usage condition of the word address is displayed on the address display section 116.

The machine-type selecting field 112 is a field for selecting the machine-type name of the PLC 4 connected with the programmable display device 3 from a plurality of the previously registered machine-type names.

The address input field 113 is a field for directly inputting, by use of a key board or the like of the host computer 2, an address to which an address display range of the address display section 116 is transferred by the jump button 115.

The address input dialog display button 114 is an operational button for displaying a dialog box by which an address is inputted. The address input dialog box is arranged so as to set an address corresponding to the machine-type of the specified PLC 4, in a form such as a list display or a spin box. The address inputted by the address input dialog box is dealt with as an address to which the address display range is transferred, as with the address inputted to the address input field 113.

Figure 7:
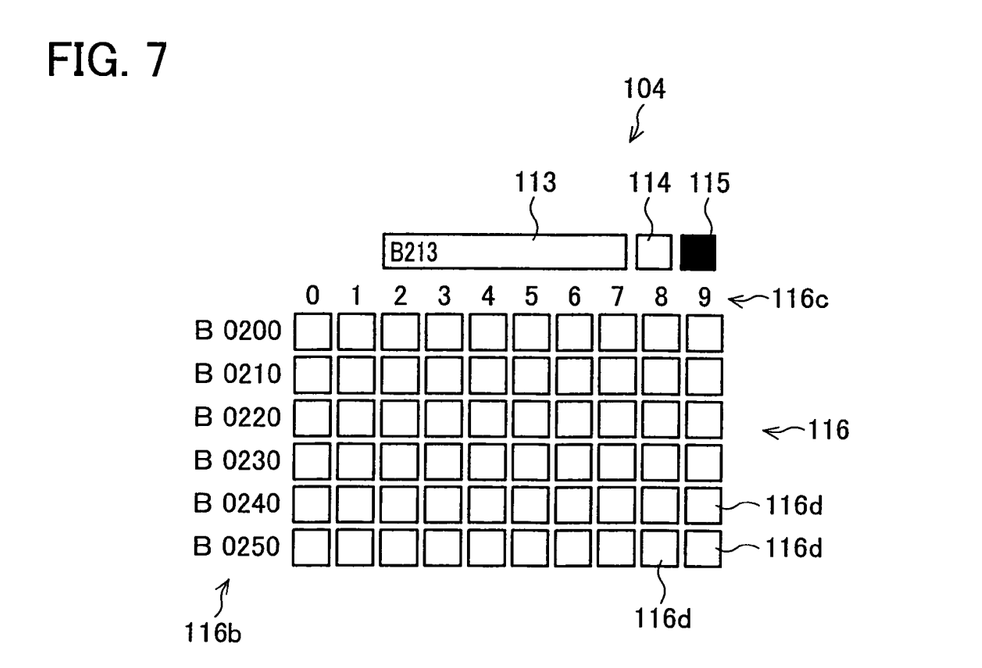
FIG. 7 is a figure illustrating a condition in which addresses including a specified address are displayed in the address list region by an operation of a jump button.

The jump button 115 is an operational button for transferring the address display range. When the jump button 115 is depressed, as shown in FIG. 7, the screen creating section 23a displays an address range on the address display section 116, so that the address range is displayed in a range including an address inputted via the address input field 113 or the address dialog input display button 114. At that time, the screen creating section 23a determines a display range by referring to addresses managed by the address management section 23c.

The address display section 116 includes a device label display section 116a, an offset label display section 116b, an index label display section 116c and a plurality of address icons 116d.

The device label display section 116a, the offset label display section 116b and the index label display section 116c respectively display a device label, an offset label, and an index label, as discrimination factors (labels) constituting an address represented by the address icon 116d. A device label displayed on the device label display section 116a is a label for discriminating an address, and is given an original label by the maker of the PLC 4. The offset label display section 116b displays an offset label that is positioned under the device label. The index label display section 116c displays an index label for showing the bit positions 0 through n (index; n is a bit number of a word device) of an address.

The address icon 116d shows the bit of an address with a figure such as a quadrate (it may be a circle or a triangle). The screen creating section 23a performs color display (or daubing) of the address icon 116d indicative of the bit of an address in use, and performs transparent display of the address icon 116d indicative of an address not in use, based on information regarding an address usage condition managed by the later-mentioned address management section 23c. In a bit mode, the screen creating section 23a performs color display of only bits in use, and in a word mode, performs color display of all bits of an address in use (the bit positions 0 through n). As for a part corresponding to both of a bit address and a word address, when an address is used in the both modes, the address icon 116d corresponding to the bit in use is displayed with a color in each mode.

The address display section 116 displays a limited range of the address icons 116d, and the example shown in the figure shows a case where n=9, namely, an address having 10 bits. However, the address display section 116 can display a hidden portion scrolling in an up/down direction or in a right/left direction using a scroll bar. Therefore, an address having a 16-bit index label can be displayed.

Figure 8:
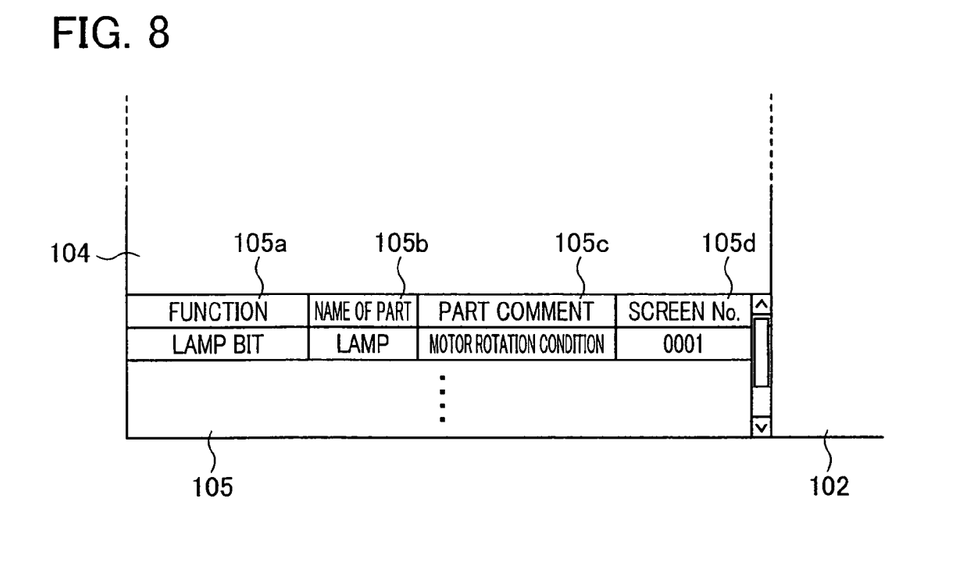
FIG. 8 is a figure illustrating a detailed structure of a reference display region provided in the screen creating window.

As illustrated in FIG. 8, the reference display region 105 displays a list of information regarding parts to which addresses (addresses in use) are assigned individually. The reference display region 105 includes as the information regarding parts a function display section 105a, a name-of-part display section 105b, a part comment display section 105c and a screen number display section 105d.

The function display section 105a is a section for displaying the function of a part. For example, the function of a lamp for performing a bit operation of ON/OFF (lighting/blackout) is displayed as "lamp bit". The name-of-part display section 105b is a section for displaying name-of-part such as a lamp and a switch. The part comment display section 105c is a section for displaying the above-mentioned comment regarding a part. The screen number display section 105d is a section for displaying a screen number given to each unit screen (the unit screen file UF). When a screen number is selected and indicated with a double click operation of a mouse or the like in the screen number display section 105d, the screen creating section 23a reads out the unit screen file UF having the screen number from a later-mentioned data storage section 24, and displays the unit screen file UF on the editing region 102.

The user disposes a selected part 106 on a base screen displayed on the editing region 102 with an operation such as drag and drop from a list of parts (not shown in the figures) displayed on the screen creating window 101, or changes the size of the part 106. Further, using a drawing function, the user daubs a lineal drawing (most of which are lines or curves), the inside of the lineal drawing or the inside of a basic figure, with a predetermined color or pattern, in substantially the same manner as conventional screen creation software, so as to create an arbitrary drawing figure on the base screen. Further, using the tag setting function, the user selects a process-indicating word W having a necessary function out of process-indicating words provided by the programmable display device 3, and sets the process-indicating word W to an arbitrary figure drawn on the base screen, so as to create a new part different from the above part provided in advance in the screen editor 23.

The address assigning section 23b assigns (matches), to a part, the above address and a comment (a variable) set by the user regarding a word device or a bit device specified by each address. To be specific, by dragging the address icon 116d displayed on the address list region 104 of the screen creating window 101 to the part 106, the address assigning section 23b displays the function list window 107 near the part 106, as illustrated in FIG. 5. Then, by dropping the address icon 116d on the function list window 107, the address assigning section 23b assigns an address to the part 106 (the function of the part 106). Further, in the same manner as a conventional case, the address assigning section 23b may be arranged so as to provide a dialog box for assigning of an address as a user interface, and assigns an address inputted by the dialog box to the part. As a result, the part 106 is connected with the address. Further, the address assigning section 23b can release assigning of an address, too.

Figure 9:
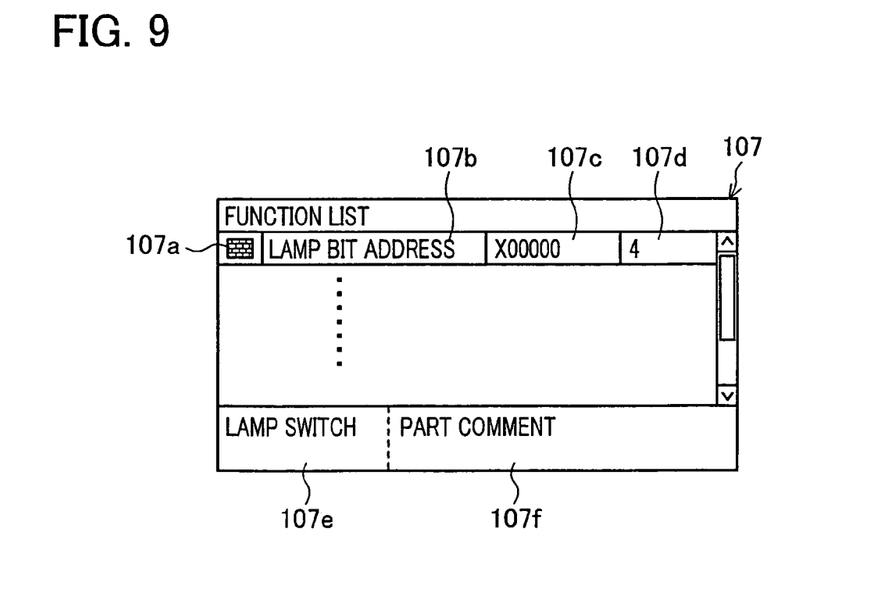
FIG. 9 is a figure illustrating a structure of a function list window displayed on an editing region of the screen creating window.

As illustrated in FIG. 9, the function list window 107 includes an icon display section 107a, a function display section 107b, an address display section 107c, a serial number display section 107d, a name-of-part display section 107e, and a part comment display section 107f, and displays a list of information regarding the part 106.

The icon display section 107a is a section for displaying an icon indicative of a part, the icon being a minified guise of the part. The function display section 107b is a section for displaying the function of the part, just like the function display section 105a in the reference display region 105. The address display section 107c is a section for displaying an address currently assigned to the part. The address display section 107c shows a blank column when no address is assigned. The serial number display section 107d is a section for displaying how many times the address is serially used. The name-of-part display section 107e is a section for displaying the name of the part, just like the name-of-part display section 105b. The part comment display section 107f is a section for displaying the comment regarding the part, just like the part comment display section 105c.

Further, because it is possible to assign different kinds of addresses according to a part (function), the function list window 107 displays a list (not shown in the figures) for selecting the kinds of addresses to be assigned. Examples of such addresses are, in addition to general addresses, an address for switching display or an address for interlock. As for the address for switching display, when one switch part switches the devices 7 to be displayed serially in a plurality of manufacturing lines, one switch part has different addresses corresponding to the devices 7 with respect to each manufacturing line, and therefore an address for specifying each of the addresses is necessary. In that case, the address for switching display is displayed in the list. Further, the address for interlock is an address for setting efficacy/non-efficacy of depressing operation of a part such as a switch.

The address management section 23c manages an address used (assigned) for a part used in each unit screen file UF of the project file PF with respect to each machine-type of the PLC 4, and stores information of a used/unused state with respect to each address. Display of a used/unused state of the address icon 116d is performed based on the information of a used/unused state of the address managed by the address management section 23c.

The address management section 23c manages used/unused states of all addresses with respect to the project file PF. To be specific, the address management section 23c sets a used state as flag "1" and an unused state as flag "0" with respect to all addresses, in a memory table 21a using a memory or the like of the controlling section 21. Further, when a current usage condition of addresses is displayed in the address list region 104, the address management section 23c reads out addresses used for each part included in each unit screen file UF in the project file PF, and forms used/unused states of the addresses in the memory table 21a. Further, the address management section 23c reflects information of a usage condition (used/unused state) of the addresses informed by the address monitoring section 23d, on the memory table 21a.

The address monitoring section 23d always monitors an address that has come into use by assignment of the address assigning section 23c and an address that has gone out of use by release of the address assigning section 23c. Further, when there is a change in a usage condition of an address, the address monitoring section 23d instantly informs the change to the address management section 23c. As a result, the address management section 23c can always store the newest information regarding the usage condition of the address.

The data storage section 24 is a storage device for storing the project file PF created by the screen editor 23. The data storage section 24 is constituted of a storage element such as a memory or a large capacity storage device such as a hard disc device. The project file PF stored in the data storage section 24 is transferred to the programmable display device 3 and preserved in the FEPROM 32b, so as to be downloaded in an execution environment.

Figure 10:
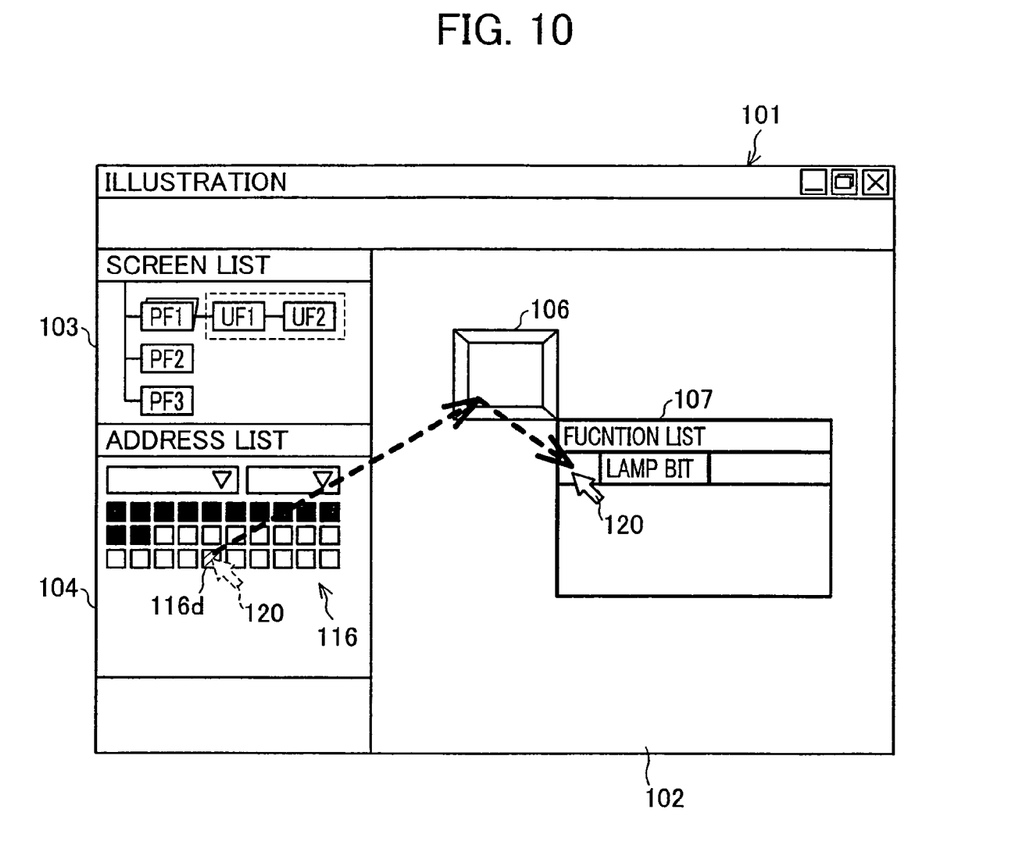
FIG. 10 is a figure illustrating an operation of address assigning in the screen creating window.

Here, a procedure of assigning an address in the controlling system 1 having the above structure is explained with respect to FIG. 10.

First, while the screen creating window 101 is open, the user selects, from the screen list region 103 or the like, a screen displaying a part to which an address is to be assigned, and displays the screen on the editing region 102. Next, the user selects the machine-type of the PLC 4 from the machine-type selecting field 112 in the address list region 104, and selects a bit mode or a word mode in the address mode selecting section 111. As a result, the screen creating section 23a acquires information regarding a usage condition of an address according to the machine-type selected from the address management section 23c, and on the basis of the information, performs color display of the address icon 116d in the address display section 116, in regard to the address in use.

From the address icons 116d displayed on the address display section 116, the user specifies, by use of a mouse pointer 120, the address icon 116d indicative of the bit of a desired address, and drags the address icon 116d to the part 106 disposed in the editing region 102. At that time, when the bit mode is selected, only the dragged address icon 116d is selected, and when the word mode is selected, all the address icons 116d in a line including the dragged address icon 116d are selected. Further, at that time, the address assigning section 23b may be arranged so that in order to visually clarify that the address icon 116d is dragged, the address assigning section 23b displays a block showing an outline of the address icon 116d by use of a broken line or the like attached to the mouse pointer 120. Further, at that time, the address assigning section 23b may be arranged so as to display the address selected by the address icon 116d, the address being attached to the mouse pointer 120.

When the address icon 116d is dragged to the part 106, the address assigning section 23b displays the function list window 107 near the part 106. When the mouse pointer 120 moves out of a range defined by the part 106, the address assigning section 23b does not display the function list window 107. Therefore, in order to directly move the mouse pointer 120 from the part 106 to the function list window 107, the address assigning section 23b displays the part 106 and the function list window 107 so that the part 106 and the function list window 107 is attached to or superposed on each other at a portion.

There is a case where the mouse pointer 120 moves out of a range defined by the part 106 due to a mouse operation while the mouse pointer 120 moves to the function list window 107. At that time, when the function list window 107 is not displayed, the function list window 107 cannot be used. Therefore, the address assigning section 23b displays the function list window 107 for a predetermined period even if the mouse pointer 120 moves out of a range defined by the part 106 (see FIG. 10), and when the mouse pointer 120 returns to the range of the function list window 107 within the predetermined period, the address assigning section 23b maintains the display of the function list window 107. The address assigning section 23b does not display the function list window 107, when the mouse pointer 120 moves out of the range of the part 106 and does not return to the range of the function list window 107 within the predetermined period.

When the user moves the mouse pointer 120 to the function list window 107 and performs a drop operation there, an address represented by the address icon 116d dragged to the part 106 is assigned to the part 106. As a result, the user can confirm the function or the like displayed on the function list window 107 and then judge whether or not the selected address is to be assigned to the part 106.

At that time, the address monitoring section 23d acknowledges that the address is assigned and then informs the address management section 23c that the address has come into use. The address management section 23c renews the address usage condition so as to indicate that the address is currently in use. The screen creating section 23a periodically reads out the address usage condition of the address management section 23c and reflects the address usage condition on the display condition of the address icon 116d in the address display section 116. As a result, the address icon 116d corresponding to the assigned address is displayed with a color, so that the user can visually confirm that the address is currently in use.

As described above, in the host computer 2, the address list region 104 as well as the editing region 102 is displayed on the screen creating window 101, the address icon 116d displayed on the address display section 116 of the address list region 104 is dragged to the part 106 and then dropped on the function list window 107, and thereby the address of the dragged address icon 116d is assigned to the part 106. As a result, assigning of an address can be carried out without closing the screen of the address list display, unlike in the conventional case.

Further, in the host computer 2, the address monitoring section 23d monitors the usage condition of addresses while the address assigning section 23b performs the assigning of an address, and when there is a change in the usage condition of addresses, the address monitoring section 23d informs the change to the address management section 23c, so that the address management section 23c always reflects a result of the assigning of an address on the usage condition of addresses. As a result, the address list region 104 instantly displays the condition of an address that has come into use or gone out of use by assigning. Therefore, unlike in the conventional case, it is unnecessary to temporarily close an address assigning screen after assigning of an address, and then read in again a usage condition of all addresses from an address management section, so as to display an address list.

As described above, according to the present embodiment, it is possible to perform assigning of an address while confirming a usage condition of addresses, and it is possible to easily confirm an unused address while assigning an address. Therefore, according to the present embodiment, assigning of an address is performed effectively.

Note that in the embodiment, assigning an address to a part is exemplified, but the same process can be performed when an address is assigned to a tag, so that assigning of an address is performed effectively. Further, the screen creating section 23a performs color display of the address icon 116d with respect to a used address, but there is a case where a used address is further used (more than one usage). At that time, an address icon may be arranged so as to be displayed with a color different from a color used for displaying a once used address. Further, the address assigning section 23c may be arranged so as to include a restricting mode for preventing the used address from being assigned (used). Further, in the present embodiment, by a drag operation to the part 106, the address assigning section 23b displays the function list window 107 and, by a drop operation on the function list window 107, assigns an address. But assigning of an address is not limited to this, and assigning of an address may be arranged so as to be performed by a drop operation directly to the part 106, without displaying the function list window 107.

Here, an overview of the present embodiment is explained.

The present screen creating device realized by the computer 2 is a screen creating device including: a screen creating section 23a for creating a screen including a display element (part 106) for displaying a condition under which data is read out of or written in a region of a memory specified by an address; and an address assigning section 23b for assigning a particular address to the display element so as to display read/write of data of the particular address, wherein the screen creating section 23a displays an address list (an address list region 104) for showing a usage condition of the address, as well as displays a screen creating region (a editing region 102) for creating the screen.

With the structure, because the screen creating section 23a displays the address list as well as the screen creating region, a user can assign an address to a display element while monitoring a usage condition of an address displayed in the address list.

It is preferable that in the screen creating device, the screen creating section 23a displays a usage condition of addresses by use of a figure with respect to each address in the address list, and the address assigning section 23b assigns a selected address to the display element, by a drag and drop operation of the figure displayed in the address list to the display element disposed in the screen creating region. As a result, simply by monitoring a usage condition of addresses in the address list and then dragging and dropping the figure of a desired address to the display element of the screen creating region, the address assigning section 23b assigns the selected address to the display element. Therefore, it is unnecessary to display a dialog box or the like and input the desired address separately, and accordingly it is possible to swiftly assign an address.

It is preferable that in the screen creating device, the address assigning section 23b displays a list of related information for showing information relating to the display element, by dragging a figure displayed in the address list to the display element disposed in the screen creating region, and the address assigning section 23b assigns a selected address to the display element, by dropping the figure on the list of related information. As a result, when the user checks a usage condition of addresses in the address list and then drags a desired figure to the display element of the screen creating region, the list of related information is displayed by the address assigning section 23b. Further, when the user drops the figure on the list of related information, the selected address is assigned to the display element by the address assigning section 23b. Therefore, the user can judge whether or not the selected address is to be assigned according to the list of related information.

It is preferable that either of the screen creating devices includes an address management section 23c for managing a usage condition of addresses, and an address monitoring section 23d for monitoring if there is a change in a usage condition of addresses, the change being caused by assigning of an address by the address assigning section 23b, and for informing the change to the address management section 23c, wherein the screen creating section 23a displays the address list, based on a usage condition of addresses managed by the address management section 23c. With the arrangement, the address monitoring section 23d monitors a usage condition of addresses while the address assigning section 23b assigns an address, and when there is a change in the usage condition of addresses, informs the change to the address management section 23c, and thereby the address management section 23c always reflects the result of assigning of an address on a usage condition of addresses. As a result, a condition of an address that has come into use or gone out of use is instantly displayed in the address list, and accordingly it is possible to swiftly reflect the result of assigning of an address on the currently displayed list of addresses. Therefore, unlike in the conventional case, it is unnecessary to temporarily close an address assigning screen after assigning of an address and read in again a usage condition of all addresses from the address management section 23c, so as to display the address list.

Further, the screen creating program is for operating any one of the screen creating devices, and causes a computer to function as the sections 23a through 23d. Further, the screen creating program is stored in a storage medium readable by a computer. As a result, the program is read out by a computer and executed, and thereby the screen creating device can be realized.

As described above, in the present screen creating device, the screen creating device 23a displays the address list as well as the screen creating region. This allows the user to be freed from a troublesome operation in which the user has to check a usage condition of addresses in the address list, temporarily close the address list, and assign an address, as is necessary in the conventional case. Therefore, effective assigning of an address can be realized easily. In this way, the present screen creating device can effectively assign an address to a part included in a screen displayed on a programmable display device. Therefore, the present screen creating device is preferably used for development of a controlling system including a programmable display device and the like.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A screen creating device comprising:
a screen creating section for creating a screen including a display element for displaying a condition under which data is read out of or written in a region of a memory specified by an address, the screen creating section displaying, on a screen creating window, both an address list for showing a usage condition of the address and a screen creating region for creating the screen;
an address assigning section for assigning a particular address to the display element, so as to cause the display element to display a condition of read/write of data of the particular address;
an address management section for managing a usage condition of the address, and
an address monitoring section for monitoring if there is a change in a usage condition of the address, the change being caused by assigning of the address by the address assigning section, and for informing the change to the address management section,
wherein the screen creating section displays the address list, based on a usage condition of the address managed by the address management section.

2. The screen creating device as set forth in claim 1, wherein the screen creating section displays a usage condition of addresses by use of a figure with respect to each address in the address list, and
the address assigning section assigns a selected address to the display element, by dragging and dropping the figure displayed in the address list to the display element disposed in the screen creating region.

3. The screen creating device as set forth in claim 2, further comprising
an address management section for managing a usage condition of the address, and
an address monitoring section for monitoring if there is a change in a usage condition of the address, the change being caused by assigning of the address by the address assigning section, and for informing the change to the address management section,
wherein the screen creating section displays the address list, based on a usage condition of the address managed by the address management section.

4. The screen creating device as set forth in claim 1, wherein the address assigning section displays a list of related information for showing information related to the display element, by dragging a figure displayed in the address list to the display element disposed in the screen creating region, and wherein the address assigning section assigns a selected address to the display element, by dropping the figure on the list of related information.

5. The screen creating device as set forth in claim 4, further comprising
an address management section for managing a usage condition of the address, and
an address monitoring section for monitoring if there is a change in a usage condition of the address, the change being caused by assigning of the address by the address assigning section, and for informing the change to the address management section,
wherein the screen creating section displays the address list, based on a usage condition of the address managed by the address management section.

6. The screen creating device as set forth in claim 4, wherein, when a pointer for indicating the figure for a drag operation moves out of a range defined by the display element after the figure is dragged to the display element, the address assigning section does not display the list of related information.

7. The screen creating device as set forth in claim 6, wherein, when the pointer for indicating the figure for a drag operation moves out of a range defined by the display element after the figure is dragged to the display element, the address assigning section displays the list of related information for a predetermined period, and when the pointer returns to the list of related information within the predetermined period, the address assigning section maintains displaying the list of related information.

8. The screen creating device as set forth in claim 1,
wherein, when a jump button provided in the address list is depressed, the screen creating section displays a usage condition of the address in the address list in a range including an inputted address.

9. The screen creating device as set forth in claim 1,
wherein the screen creating section displays a usage condition of the address by varying a display state of an address icon that represents a bit of an address with a figure.

10. The screen creating device as set forth in claim 9,
wherein the screen creating section performs color display of an address icon corresponding to an address in use, and transparent display of an address icon not in use.

11. A screen creating method comprising:
a screen creating step for creating a screen including a display element for displaying a condition under which data is read out of or written in a region of a memory specified by an address; and
an address assigning step for assigning a particular address to the display element so as to cause the display element to display a condition of read/write of data of the particular address,
wherein the screen creating step displays, on a screen creating window, both an address list for showing a usage condition of the address and a screen creating region for creating the screen, and
further comprising:
an address management step for managing a usage condition of the address, and
an address monitoring step for monitoring if there is a change in the usage condition of the address, the change being caused by assigning of the address by the address assigning step, and for informing the change to the address management step,
wherein the screen creating step displays the address list, based on a usage condition of the address managed by the address management step.

12. The screen creating method as set forth in claim 11, wherein the screen creating step displays a usage condition of addresses by use of a figure with respect to each address in the address list, and
the address assigning step assigns a selected address to the display element, by dragging and dropping a figure displayed in the address list to the display element disposed in the screen creating region.

13. The screen creating method as set forth in claim 12, further comprising:
an address management step for managing a usage condition of the address, and
an address monitoring step for monitoring if there is a change in the usage condition of the address, the change being caused by assigning of the address by the address assigning step, and for informing the change to the address management step,
wherein the screen creating step displays the address list, based on a usage condition of the address managed by the address management step.

14. The screen creating program as set forth in claim 11, wherein the address assigning process displays a list of related information for showing information related to the display element, by dragging a figure displayed in the address list to the display element disposed in the screen creating region, and the address assigning section assigns a selected address to the display element, by dropping the figure on the list of related information.

15. The screen creating method as set forth in claim 14, further comprising:
an address management step for managing a usage condition of the address, and
an address monitoring step for monitoring if there is a change in a usage condition of the address, the change being caused by assigning of the address by the address assigning step, and for informing the change to the address management step,
wherein the screen creating step displays the address list, based on the usage condition of the address managed by the address management step.

16. The screen creating program as set forth in claim 14, wherein the address assigning process does not display the list of related information when a pointer for indicating the figure for a drag operation moves out of a range defined by the display element after the figure is dragged to the display element.

17. The screen creating program as set forth in claim 16, wherein, when the pointer for indicating the figure for a drag operation moves out of a range defined by the display element after the figure is dragged to the display element, the address assigning section displays the list of related information for a predetermined period, and when the pointer returns to the list of related information within the predetermined period, the address assigning section maintains displaying the list of related information.

18. The screen creating method as set forth in claim 11,
wherein, when a jump button provided in the address list is depressed, the screen creating step displays a usage condition of the address in the address list in a range including an inputted address.

19. The screen creating method as set forth in claim 11,
wherein the screen creating step displays a usage condition of the address by varying a display state of an address icon that represents a bit of an address with a figure.

20. The screen creating method as set forth in claim 19,
wherein the screen creating step performs color display of an address icon corresponding to an address in use, and transparent display of an address icon not in use.

21. A storage medium readable by a computer, for storing a screen creating program for operating a screen creating device,
wherein the screen creating program causes a computer to carry out (i) a screen creating process for creating a screen including a display element for displaying a condition under which data is read out of or written in a region of a memory specified by an address and (ii) an address assigning process for assigning a particular address to the display element so as to cause the display element to display a condition of read/write of data of the particular address,
the screen creating process displays, on a screen creating window, both an address list for showing a usage condition of the address and a screen creating region for creating the screen,
the screen creating program further causes a computer to carry out an address management process for managing a usage condition of the address, and
an address monitoring process for monitoring if there is a change in a usage condition of the address, the change being caused by assigning of the address by the address assigning process, and for informing the change to the address management process; and
the screen creating process displays the address list, based on a usage condition of the address managed by the address management process.

22. The storage medium as set forth in claim 21, wherein the screen creating process displays a usage condition of addresses by use of a figure with respect to each address in the address list, and the address assigning process assigns a selected address to the display element, by dragging and dropping a figure displayed in the address list to the display element disposed in the screen creating region.

23. The storage medium as set forth in claim 22, wherein:

the screen creating program further causes a computer to carry out an address management process for managing a usage condition of the address, and an address monitoring process for monitoring if there is a change in a usage condition of the address, the change being caused by assigning of the address by the address assigning process, and for informing the change to the address management process; and the screen creating process displays the address list, based on the usage condition of the address managed by the address management process.

24. The storage medium as set forth in claim 21, wherein the address assigning process displays a list of related information for showing information related to the display element by dragging a figure displayed in the address list to the display element disposed in the screen creating region, and the address assigning section assigns a selected address to the display element by dropping the figure on the list of related information.

25. The storage medium as set forth in claim 24, wherein:

the screen creating program further causes a computer to carry out an address management process for managing a usage condition of the address, and an address monitoring process for monitoring if there is a change in a usage condition of the address, the change being caused by assigning of the address by the address assigning process, and for informing the change to the address management process; and the screen creating process displays the address list, based on the usage condition of the address managed by the address management process.

26. The storage medium as set forth in claim 24, wherein the address assigning process does not display the list of related information when a pointer for indicating the figure for a drag operation moves out of a range defined by the display element after the figure is dragged to the display element.

27. The storage medium as set forth in claim 26, wherein, when the pointer for indicating the figure for a drag operation moves out of a range defined by the display element after the figure is dragged to the display element, the address assigning section displays the list of related information for a predetermined period, and when the pointer returns to the list of related information within the predetermined period, the address assigning section maintains displaying the list of related information

* * * * *